Re. 24780
Jan. 7, 1958     W. E. BUCK     2,819,441
ELECTRIC MOTOR
Filed Oct. 19, 1954     2 Sheets-Sheet 1
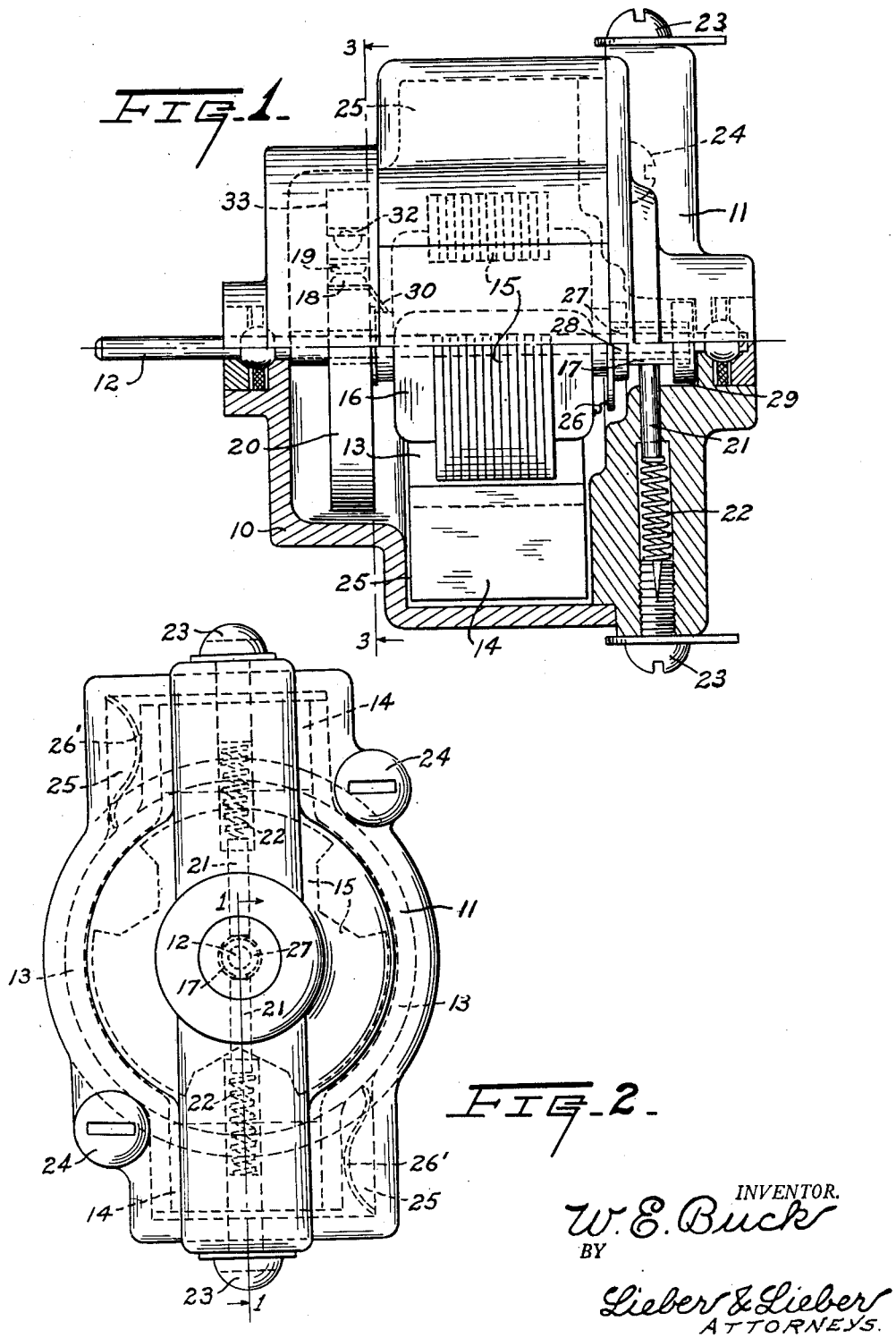
INVENTOR.
W. E. Buck
BY
Lieber & Lieber
ATTORNEYS.

Jan. 7, 1958  W. E. BUCK  2,819,441
ELECTRIC MOTOR
Filed Oct. 19, 1954  2 Sheets-Sheet 2
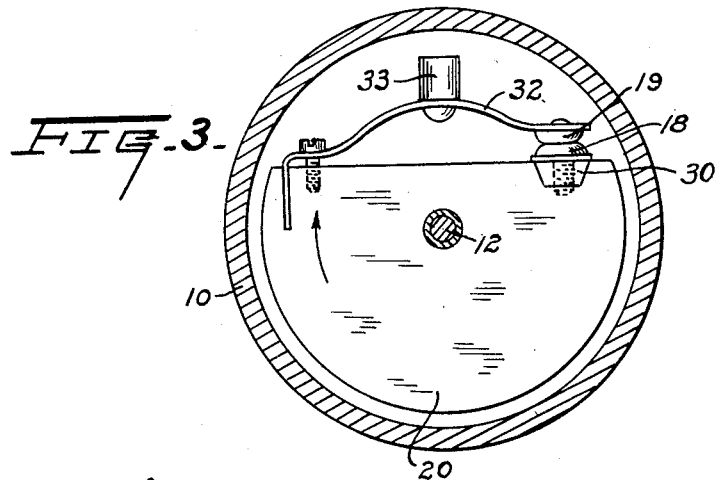
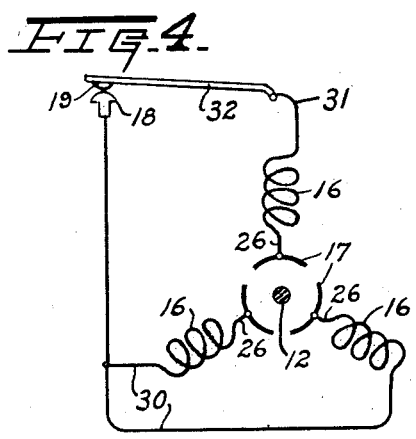
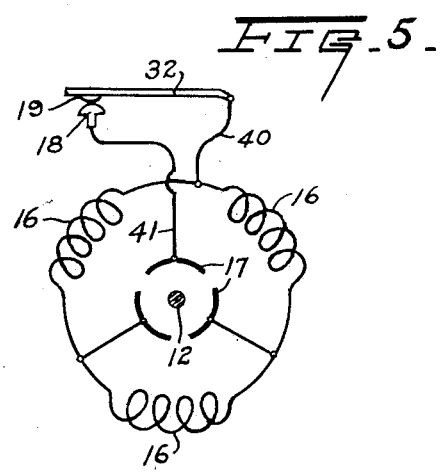
INVENTOR.
BY W. E. Buck
Lieber & Lieber
ATTORNEYS.

# 2,819,441

ELECTRIC MOTOR

Willard E. Buck, Boulder, Colo., assignor, by mesne assignments, to Kindar Corporation, a corporation of Delaware Application October 19, 1954, Serial No. 463,106

2 Claims. (Cl. 318—325)

The present invention relates in general to improvements in electric motors, and relates more specifically to improvements in the construction and operation of instrumentalities for controlling the speed of such motors.

The primary object of the present invention is to provide improved automatically functioning control means for accurately and effectively regulating the speed of a rotary electric motor.

It has heretofore been common practice to control the speed of electric motors with the aid of slip rings associated with the armature windings. This slip ring construction is necessarily relatively complicated and rather inefficient especially when applied to fractional horse power motors wherein the working parts are very small and difficult to construct and assemble. While some attempts have heretoforebeen made to eliminate the use of slip rings and to control the motor speed by substitute methods, none of these have proven commercially satisfactory since the substitute controls were not reliable in action and required accurate periodic adjustments in order to obtain any degree of proper regulation.

It is therefore an important object of the present invention to provide an improved speed regulator for electric motors, wherein the use of slip rings is avoided, and which is very simple and compact in construction but highly efficient in operation.

Another important object of this invention is to provide an efficient electric motor adapted to be actuated from low voltage sources such as batteries, and which may be readily manufactured in diverse sizes at moderate cost.

A further important object of the invention is to provide a simple mode of regulating the speed of electric motors, which will function effectively throughout a wide range of voltage and load variations, and which is also capable of maintaining desirable motor speeds without requiring additional adjustments after proper initial installation of the regulator.

Still another important object of this invention is to provide an improved motor speed regulating system especially applicable to very small and delicate electric motors having permanent magnetic fields cooperating with rotary armatures having several poles embraced by windings which are energized from low voltage sources such as dry cell batteries.

An additional object of the invention is to provide an improved regulator for maintaining substantially constant speed in electric motors with minimum energy consumption, and with the aid of few durable parts adapted to be conveniently assembled and permanently confined within a sealed enclosure.

These and other more specific objects and advantages of the invention will be apparent from the following detailed description from which it will be noted that the gist of the improvement is the provision of a speed regulator for an electric motor having a rotary armature provided with several poles each energized by an independent winding, and also having one or more switches operable by centrifugal force resulting from rotation of the armature for cutting one or more of the windings out of or into action so as to vary the electromotive force and to thereby maintain the motor speed substantially constant.

A clear conception of the features constituting the present improvement, and of the construction and operation of several typical electric motors embodying the same, may be had by referring to the drawings accompanying and forming a part of this specification in which like reference characters designate the same or similar parts in the various views.

Fig. 1 is part sectional side view of a constant speed electric motor having stationary poles cooperable with a triple pole rotary armature, the section having been taken through the motor housing along the line 1—1 of Fig. 2;

Fig. 2 is an end elevation of the same electric motor looking toward the left of Fig. 1;

Fig. 3 is another transverse section through the same electric motor, taken along the line 3—3 of Fig. 1;

Fig. 4 is a diagram illustrating the preferred armature connections with the commutator and centrifugal control switch used in the three pole armature windings of the motor illustrated in Figs. 1, 2 and 3; and Fig. 5 is a similar diagram showing modified armature connections which may be utilized in the speed regulation of the same type of electric motor.

While the invention has been illustrated and described herein as having been embodied in a small electric motor having its field energized by permanent magnets and its armature windings adapted to be energized by low voltage batteries or the like, it is not the intent to unnecessarily restrict the use of the improved features to such a motor; and it is also contemplated that specific descriptive terms employed herein be given the broadest possible interpretation consistent with the disclosure.

Referring to Figs. 1, 2 and 3 of the drawing, the typical improved electric motor shown therein, comprises a general, a main cup-shaped casing 10 having a closure cover 11 at one end; a main shaft 12 journalled for rotation in the casing 10 and cover 11 and extending through and beyond the casing interior; a pair of magnetic pole pieces 13 extending across the interior of the casing 10 on opposite sides of the shaft 12 and being energized by a pair of permanently magnetic blocks 14 cooperating with opposite end portions of the pole pieces remote from the shaft 12; a rotary armature secured to the shaft 12 within the casing 10 and having three radial poles 15 each provided with a current conducting winding 16 and cooperating with the field 13; a commutator having three segments 17 each connected to the inner end of one of the armature windings 16 the opposite or outer ends of two of which are connected to the fixed and movable contacts 18, 19 respectively of a single centrifugal switch carried by a revolving support 20 rotatable with the armature; and a pair of diametrically opposed radial brushes 21 slidable within the closure cover 11 and being urged toward the commutator segments 17 by coil springs 22 each coacting with a terminal screw 23 adapted to be connected to a source of electric energy.

The main housing or casing 10 and the cover 11 are preferably formed of non-conducting material such as plastic, and the cover 11 may be secured to the housing casing 10 with several screws 24 to provide a sealed enclosure for the internal working parts of the motor after these parts have been properly installed and initially adjusted. The magnetic pole pieces 13 are confined within opposed recesses 25 formed in the motor casing 10, and the magnet blocks 14 which energize these pole pieces 13 are preferably formed of material such as "Alnico" metal having high magnetic permeability and capable of being intensely permanently magnetized. Since the permanent magnets constitute no essential part of the present invention, they may obviously be replaced by the well known electro-magnets. The portions of the pole pieces 13 which coact with the armature are arcuate and snugly fit the casing interior, and the magnet confining portions of the pole pieces coact with leaf springs 26 as shown in Fig. 2.

The core and poles 15 of the armature are composed of ferrous laminations and the corresponding inner ends of the armature windings are connected to the adjacent commutator segments 17 by conductors 26. These segments 17 are formed of highly conductive material and are carried by an insulating bushing 27 secured to the shaft 12 being held in place by retainer rings 28, 29 also formed of insulation. In the embodiment of Figs. 1 to 4, the opposite outer ends of two of the windings are connected by means of conductors 30 to the fixed contact 18 of the single centrifugal switch, while the corresponding opposite outer end of the third winding is connected by a conductor 31 to the suspension end of a resilient arm 32 the opposite swinging end of which carries the movable contact 19, see Fig. 4. The medial portion of this flexible arm 32 which is formed of conducting material, may also be curved and provided with a weight 33 as shown in Figs. 1 and 3, and this weight serves to create a wiping action between the contacts 18, 19, and the rotary contact support 20 which is formed of insulation and acts as a flywheel may be secured in any suitable manner either to the shaft 12 or to the adjacent end of the armature.

The radial brushes 21 are formed of conducting material and are cooperable at their inner ends with the revolvable commutator segments 17, while their medial portions are slidable in bores in the closure cap or cover 11 and their outer ends coact with the helical springs 22. These springs 22 constantly resiliently urge the brushes 21 against the commutator segments 17, and are accessible upon removal of the terminal screws 23 which may be connected to any suitable source of direct current electric energy such as a dry cell or other low voltage source. The commutator and brush assemblage as well as the armature, while being normally concealed within the casing 10 and cover 11, are all readily accessible for inspection upon removal of the screws 24.

When an electric motor has been constructed and assembled as shown in Figs. 1 to 4 inclusive, the terminals 23 should preferably be connected to the source of electric energy such as a battery, to energize the windings 16 and to cause the armature to rotate in a clockwise direction as viewed in Fig. 3. While operating below normal speed, the switch contacts 18, 19 will remain closed thereby maintaining all of the windings 16 and poles 15 active. But by causing the speed of the armature to increase above normal, centrifugal force acting upon the movable contact 19, arm 32 and weight 33 will promptly open the switch and will thereby make two of the coils 16 which are connected to the movable contact 19 inactive. This results in a substantial reduction in the armature propelling force with a resultant return to slightly below normal speed. The contacts 18, 19 will thereafter alternately open and close in rapid succession, thus causing the armature to oscillate slightly above and below normal speed and maintaining the average speed constant.

Since the single governing switch acts upon extremely slight speed variations, the making and breaking of the electric circuit through a winding 16 frequently occurs several times during a complete revolution of the armature. Therefore, although technically some slight variation in rotor speed must occur in order to initiate movement of the movable switch contact 19, this speed variation is so small that it is not noticeable, and the armature speed does not in fact oscillate back and forth by several revolutions per minute. Furthermore, the oscillation hereinabove referred to is not of the normally free type such as takes place in a vibrating member, but is completely controlled by the instantaneous speed increment variations of the armature which acts upon the governing system to either momentarily increase or decrease the power in accordance with the requirements of the motor in order to maintain its constant or uniform speed.

The motor speed will thus be automatically maintained substantially constant by the single sensitive centrifugal switch which obviously has a low friction coefficient and therefore acts rapidly and effectively after the parts have been initially properly assembled and adjusted. The curvature and resiliency of the movable contact carrier arm 32 provides an effective wiping action for keeping the contact surfaces clean, and the revolving relatively massive support 20 also provides sufficient flywheel or inertia effect to cause quick but gentle opening and closing of the switch without undue shock. Also by rotating the armature in the direction indicated in Fig. 3, acceleration in speed tends to more rapidly and effectively open the switch thus producing closer speed regulation in spite of extreme load and voltage variations.

While the preferred assemblage shown in Figs. 1 to 4 inclusive is simple and effective in maintaining substantially constant speed, the same results are also obtainable with modified switch and armature assemblies such as illustrated in Fig. 5 wherein the same type of single centrifugal switch is utilized in conjunction with a three pole armature but the armature windings are connected in series with the movable contact 19 by a conductor 40 and one of the commutator segments 17 is directly connected by another conductor 41 to the fixedly mounted contact 18. With such an assemblage, when the centrifugal switch opens, all of the windings 16 become ineffective whenever the segment 17 which is connected to the fixed contact 18 passes one of the brushes 21, thus momentarily reducing the power output of the motor and restoring normal motor speed.

It is to be noted that with the corresponding end of each of the three armature energizing windings 16 directly connected to one of the three commutator segments 17 which coact with two diametrically opposed brushes 21, and with the switch contacts 18, 19 interposed between the opposite ends of the windings 16 as in Figs. 1 to 4 inclusive, when the switch is closed two thirds of the windings are effective two thirds of the time, whereas with the switch open, two thirds of these windings are effective only one third of the time.

It has been found that with the aid of the present improvement the speed regulation can be held to one percent or less, thus maintaining substantially constant speed throughout considerable ranges of load conditions. The improvement eliminates necessity of utilizing slip rings and other more complicated devices to control the motor speed, and the simple centrifugal switch functions rapidly, positively and with utmost precision after having been initially properly installed and adjusted. The use of the weight 33 on the resilient movable contact carrier arm 32 is optional, and this weight when used may be located anywhere along the arm 32 where it will most effectively perform its function and this arm 32 may also be of any desired shape in order to produce most efficient wiping of the switch contacts. The use of permanent magnets instead of electromagnets is not essential but may be preferable in very small motors operable by dry-cells. The invention is applicable to various types and sizes of motors, and has proven highly satisfactory and successful especially as applied to phonograph motors or the like.

It should be understood that it is not desired to limit the invention to the exact details of construction and operation of the electric motor assemblage herein specifically shown and described, since various modifications within the scope of the appended claims may occur to persons skilled in the art.

I claim:

1. In an electric motor, a rotary armature having at least three poles and a similar number of commutator segments all revolvable with the armature, a pair of brushes connected to an outside source of electrical energy and being cooperable with said segments to transmit electric current therethrough, an independent energizing winding for each of said poles each having one end directly connected to one of said segments, fixed magnetic pole pieces cooperable with said armature poles and windings to revolve said armature, and a centrifugal switch revolvable with the armature and being interposed between the opposite ends of said windings, a majority of said windings being energized whenever the armature is rotating and said majority of the windings being energized for a major portion of the time while the switch is closed but being reduced to a minor portion of the time while the switch is open to maintain the armature speed substantially constant.

2. In an electric motor, a rotary armature having three poles and a like number of commutator segments all revolvable with the armature, a pair of diametrically opposed brushes connected to an outside source of electrical energy and being cooperable with said segments to transmit electric current therethrough, an independent energizing winding for each of said poles each having one end directly connected to one of said segments, permanently magnetized pole pieces cooperable with said armature poles and windings to revolve said armature, and a centrifugal switch revolvable with and operable by the rotation of said armature and being interposed between the opposite ends of said windings, two thirds of said windings being energized whenever the armature is rotating and said two thirds of the windings being energized for two thirds of the time while the switch is closed but for only one third of the time while the switch is open to maintain the armature speed substantially constant.

References Cited in the file of this patent

UNITED STATES PATENTS

| | | |
|---|---|---|
| 111,112 | Edison | Jan. 24, 1871 |
| 1,982,000 | Griffith | Nov. 27, 1934 |
| 2,176,804 | Roth et al. | Oct. 17, 1939 |
| 2,453,101 | Schulz | Nov. 2, 1948 |
| 2,456,701 | Hansen et al. | Dec. 21, 1948 |
| 2,478,848 | Sullivan et al. | Aug. 9, 1949 |
| 2,552,296 | Russell | May 8, 1951 |
| 2,738,391 | Tesh | Mar. 13, 1956 |